United States Patent
Nedeltchev et al.

(10) Patent No.: US 12,494,999 B2
(45) Date of Patent: Dec. 9, 2025

(54) SCHEDULED FIB TO ACCOUNT FOR INTERMITTENT CONNECTIVITY DUE TO ORBITAL DYNAMICS

(71) Applicant: Cisco Technology, Inc., San Jose, CA (US)

(72) Inventors: Plamen Nedeltchev, San Jose, CA (US); Bruce McDougall, Anacortes, WA (US)

(73) Assignee: Cisco Technology, Inc., San Jose, CA (US)

( * ) Notice: Subject to any disclaimer, the term of this patent is extended or adjusted under 35 U.S.C. 154(b) by 509 days.

(21) Appl. No.: 18/158,884

(22) Filed: Jan. 24, 2023

(65) Prior Publication Data

US 2024/0250907 A1    Jul. 25, 2024

(51) Int. Cl.
| | |
|---|---|
| *H04L 45/745* | (2022.01) |
| *H04L 45/02* | (2022.01) |
| *H04L 45/17* | (2022.01) |
| *H04L 47/283* | (2022.01) |
| *H04L 49/25* | (2022.01) |
| *H04L 61/2592* | (2022.01) |

(52) U.S. Cl.
CPC .......... *H04L 45/745* (2013.01); *H04L 45/02* (2013.01); *H04L 45/17* (2022.05); *H04L 47/283* (2013.01); *H04L 49/252* (2013.01); *H04L 61/2592* (2013.01)

(58) Field of Classification Search
CPC ....... H04L 45/745; H04L 45/17; H04L 45/02; H04L 47/283; H04L 49/252; H04L 61/2592

USPC ........................................................ 370/329
See application file for complete search history.

(56) References Cited

U.S. PATENT DOCUMENTS

| | | | | |
|---|---|---|---|---|
| 2018/0351857 | A1* | 12/2018 | Vairavakkalai | H04L 63/0272 |
| 2019/0173791 | A1* | 6/2019 | Lim | H04L 45/54 |
| 2022/0161944 | A1* | 5/2022 | Rhoads | H04B 7/18513 |

OTHER PUBLICATIONS

Gkatzikis, et al., "Bandwidth Calendaring: Dynamic Services Scheduling over Software Defined Networks," IEEE ICC 2016, Communication QoS, Reliability and Modeling Symposium, 7 pages.
Li, et al., "Fractal Rosette: A Stable Space-Ground Network Structure in Mega-constellation," Institute for Network Science and Cyberspace, Tsinghua University, May 2021, 17 pages.
Anonymous, "Schedule-Aware Bundle Routing," CCSDS (The Consultative Committee for Space Data Systems), Blue Book, Jul. 2019, 38 pages.

* cited by examiner

*Primary Examiner* — Anthony Mejia
(74) *Attorney, Agent, or Firm* — Polsinelli P.C.

(57) ABSTRACT

Disclosed herein are systems, methods, and computer-readable media for network communication within a Lunar and Interplanetary communication system. In one aspect, a length of time of line of sight occlusion associated with an object is determined based on a position of the object within its orbit. A dynamic forwarding table is generated that schedules packet paths among nodes within the network based on the length of time of the line of sight occlusion. A packet path for a packet is determined based on the dynamic forwarding table, where the packet path is based on minimizing the length of time of the line of sight occlusion associated with the object.

20 Claims, 6 Drawing Sheets

| Sender | Recvr | From | Until | Range (light seconds) |
|--------|-------|------|-------|----------------------|
| A | B | 1000 | 1100 | 1 |
| A | C | 1100 | 1200 | 30 |
| B | D | 1400 | 1500 | 120 |
| C | D | 1500 | 1600 | 90 |

SCHEDULED FIB TO ACCOUNT FOR INTERMITTENT CONNECTIVITY DUE TO ORBITAL DYNAMICS

BACKGROUND

As IP services extend beyond the confines of Earth, there is a need for full-coverage communications and navigation services, as well as cross-cutting technical expertise to move IP services forward into the future. These services are critical to operating satellites, robotic spacecraft, and human exploration missions, as well as returning data to Earth where it can be used for the benefit of humanity. These capabilities support services and missions providing critical connectivity from satellites, spacecraft, grounded stations on orbiting bodies such as the moon, Mars, other planets and/or asteroids, etc. to the ground.

Reliable IP services are needed to empower mission-critical communications and navigation services and enable the transmission of science and exploration data to and from space. As a single point of service for missions in the near space region—out to two million kilometers (km) from Earth—the network currently connects users using either government or commercial service providers. However, extending IP services beyond Earth orbit and the Moon is problematic due to the long round trip times and interruptions to line of sight connectivity caused by orbital mechanics.

These disruptions can have massively harmful effects. As a single, end-to-end network, current IP service systems orchestrates communications and navigation services, space links, and data transport for users and applications and equipment. These can include communications central to missions throughout their entire lifecycle, providing requirements analysis, spectrum management, communications analysis, service agreements, mission design, mission planning, and/or support for launch, operations, and post-mission activities. As a result, systems and methods are needed that ensures its users have robust and reliable communications and navigation services that fully support their mission objectives within the challenges present in a space environment.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure is directed to IP services within a Lunar and Interplanetary communication system that delivers network communication through schedule-aware packet routing. This approach solves challenges relating to long round trip times and interruptions to line of sight connectivity caused by orbital mechanics.

In one aspect, network communication within a Lunar and Interplanetary communication system includes determining a length of time of line of sight occlusion associated with an object based on a position of the object within its orbit. A dynamic forwarding table is generated that schedules packet paths among nodes within the network based on the length of time of the line of sight occlusion. A packet path for a packet is determined based on the dynamic forwarding table, wherein the packet path is based on minimizing the length of time of the line of sight occlusion associated with the object.

In another aspect, it is determined that a destination for the packet is temporarily unreachable for packet paths based on the line of sight occlusion. As the packet travels between nodes, the packet is punted to a store-and-forward node as long as the line of sight occlusion prevents a forwarding path to the destination. The packet is forwarded to the destination from the store-and-forward node based on a determination that the line of sight occlusion will end at the time of packet forwarding.

In another aspect, the network includes ground stations as hubs and one or more of sensors, orbiting stations, and forwarding nodes as spokes.

In another aspect, addresses are dynamically reassigned within a forwarding information base (FIB) by automatically updating a dynamic multipoint virtual private network (DMVPN) mesh and forwarding tables in accordance with topology changes in space.

In another aspect, a spoke device or endpoint within the network is associated with a hub by a subnet and by a Next Hop Resolution Protocol (NHRP) identification number to route the packet in accordance with the dynamic forwarding table associated with orbiting distributed nodes.

In another aspect, a reachability calendar for one or more nodes or destination subnets in an extraterrestrial network is proactively determined, in a centralized Software Defined Network (SDN) system, based upon an orbital location and line of sight reachability to other nodes in the extraterrestrial network.

In another aspect, a time-based rolling forwarding table is generated, at each node within the network, based on a location and the length of time of the line of sight occlusion. Entries within the time-based rolling forwarding table include next hops and tunnel encapsulations for the packet that minimize the length of time of the line of sight occlusion associated with the object.

In another aspect, it is determining that the packet path includes a node that is unreachable at the time of forwarding. The packet is forwarded to the node based on a determination that the node will become reachable within a line of sight at a subsequent time, such that the packet is stored in transit as it traverses space to a next hop.

In another aspect, traffic is prevented from being forwarded to reachable downstream nodes within an extraterrestrial network whose storage is filling up.

In one aspect, network communication within a Lunar and Interplanetary communication system includes a computing apparatus including a processor and a memory storing instructions that, when executed by the processor, configure the apparatus to determine a length of time of line of sight occlusion associated with an object based on a position of the object within its orbit. A dynamic forwarding table is generated that schedules packet paths among nodes within the network based on the length of time of the line of sight occlusion. A packet path for a packet is determined based on the dynamic forwarding table, wherein the packet path is based on minimizing the length of time of the line of sight occlusion associated with the object.

In one aspect, a non-transitory computer-readable storage medium includes instructions that when executed by a computer, cause the computer to determine a length of time of line of sight occlusion associated with an object based on a position of the object within its orbit. A dynamic forwarding table is generated that schedules packet paths among nodes within the network based on the length of time of the line of sight occlusion. A packet path for a packet is determined based on the dynamic forwarding table, wherein the packet path is based on minimizing the length of time of the line of sight occlusion associated with the object.

Description of Example Embodiments

Figure 1:
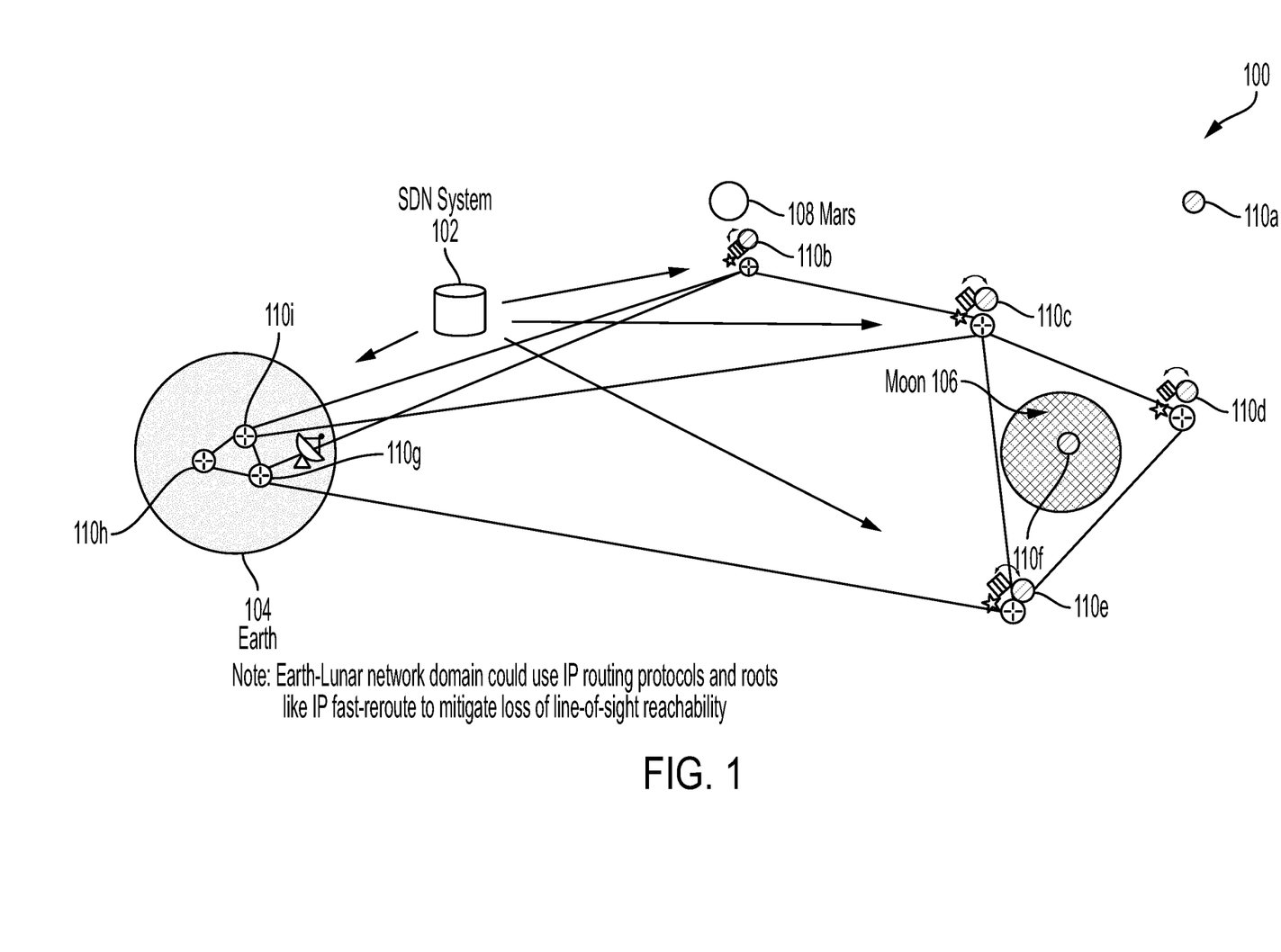
FIG. 1 illustrates an example Lunar and Interplanetary communication system in accordance with an example embodiment.

FIG. 1 illustrates an example Lunar and Interplanetary communication system in accordance with an example embodiment. Network 100 shows a space-ground network that includes a Software-Defined Networking (SDN) system 102 that spans Earth 104, the moon 106, and Mars 108. It should be noted that network 100 may span any range of space to include ground or space-based networking encompassing near- and far-Earth orbit, planetary bodies and/or their associated moons, asteroid-based stations, satellites, solar system and extra-solar system bodies, etc.

The example SDN system 102 of network 100 can include a constellation of nodes 110a-110i, although any number of nodes can be included within network 100. The nodes can be, for example, a given router, switch, or other network element. Network 100 can include both ground stations and orbiting stations, and both terrestrial nodes and extraterrestrial nodes. For example, network 100 can include ground stations as hubs; and one or more of sensors, orbiting stations, and forwarding nodes as spokes within SDN system 102. In the example embodiment shown, for example, node 110g, node 100h, and node 110i are associated with a terrestrial ground station on earth 104. These nodes, within the frame of Earth itself, can be stationary, but other nodes within network 100 are constantly moving with respect to earth 104. These nodes, for example, can be ground nodes on the moon 106 (e.g., node 110f) or Mars 108 (not shown), or can be nodes in movement within space (e.g., node 110a, node 110b, node 110c, node 110d, and/or node 110e). Some nodes may be in orbit around the earth 104 or the sun (e.g., node 110a, node 110b), while other nodes may be in orbit around another celestial body (e.g., in orbit around moon 106 such as node 110c, node 110d, and node 110e). Some nodes may be located within Lagrange points or other areas of high orbital stability.

SDN system 102 can be a satellite constellation, in which nodes within SDN system 102 accommodate space topology changes as the nodes follow each of their orbital paths. Compared to traditional satellite networks, these satellite constellations promise ultra-low network latency and high throughput that are competitive to terrestrial networks.

Moreover, with IP services enabled through satellites, these constellations offer global Internet coverage to users that were not easily reachable by terrestrial networks, such as those in rural areas and the ocean.

A challenge for such space-ground network is in guaranteeing stability under the satellite's and earth's high mobility. Unlike traditional satellite and terrestrial networks, the space-ground network of network 100 exhibits highly dynamic many-to-many mapping between moving satellites and terrestrial users. Each satellite, for example, can cover ≈100,000 users, while each terrestrial user has visibility to ≈20 satellites in some constellations. The high satellite mobility and earth's 104 rotation force the terrestrial users to frequently re-associate to new satellites. Therefore, the network topology between the space and ground repetitively changes, which results in frequent network address changes and routing protocol reconvergence. For example, constellations running IP protocols show that every terrestrial user may need to switch its IP address every 133-510 seconds (with 2,082-7,961 users changing IP addresses every second), and the network usability decreases to ≤20% with frequent routing re-convergence. Even worse, both stability issues are amplified as constellations scale to massive satellites.

A cause of the above unstable space-ground network is the mismatch between the network in the virtual cyberspace and constellations in the physical world. On one hand, classical constellations primarily focus on offering good coverage, but neglect the demands of stable network topology, addressing, and routing. On the other hand, most satellite networks in virtual cyberspace heavily rely on logical address and routing, which are vulnerable to the high satellite mobility of Earth's 104 rotations in reality. Therefore, a stable space-ground network at scale calls for a coherent design between cyberspace and reality.

The practical effects of such a mismatch can be seen in the problems associated with internet connectivity due to the long round trip times and interruptions to line of sight connectivity caused by moving objects (e.g., occlusions to line of sight communications caused by the satellite itself and other satellites, planetary orbits, orbiting space debris, asteroids and other solar system objects, etc.). These line of sight interruptions can be predicted based on the orbital mechanics of the moving objects.

Systems and methods herein disclose an example Lunar and Interplanetary communication system (e.g., network 100) that uses an SDN based forwarding information base (FIB) (also known as a forwarding or MAC table) for scheduled routing, in which the centralized SDN system 102 pre-calculates a reachability calendar for every node in the space network based upon orbital location and line of sight reachability to other nodes in the network 100. The SDN system 102 then programs every IP node in the space network with a time-based rolling forwarding table. Once up and running with its rolling FIB, the IP node automatically modifies its FIB per its reachability calendar.

For example, the SDN system 102 determines a length of time of line of sight occlusion associated with an object based on a position of the object within its orbit. The object can be, for example, any moving object that occludes line of sight communications, such as movement of the satellite itself (e.g., rotation of the ground on which it rests) and other satellites, planetary orbits, orbiting space debris, asteroids and other solar system objects, etc. The SDN system 102 can, in conjunction with nodes 110a-110i, generate a dynamic forwarding table (e.g., FIB) that schedules packet paths among the nodes within network 100 based on the length of time of the line of sight occlusion. Each node can determine a packet path for a packet based on the dynamic forwarding table. For example, in some embodiments, the packet can be based on minimizing the length of time of the line of sight occlusion associated with the object.

Under terrestrial or static conditions, the FIB can describe a set of forwarding paths that remain static—e.g., unless a network malfunction occurs, the packet paths laid out in the FIB do not change over time. In space, however, communication between nodes depends on light of sight communications, which are subject to disruptions caused by occluding events, such as a router (or the vehicle carrying the router) (e.g., node 110d) passes behind the moon 106 or some other object or body in space. The node can then lose its line of sight connection to its remote peers where it needs to transmit data. For example, node 110d loses its line of sight connection to earth 104 via node 110g. When that happens, either the traffic is dropped, and/or node 110d that has lost that route attempts to find a re-route for the packet. This creates an intermittent loss of connectivity between node 110d and node 110g. However, this intermittent loss of connectivity is predictable and a re-route can be determined beforehand to prevent loss of connectivity between node 110d and node 110g.

For example, the centralized SDN system 102 can proactively determine a reachability calendar for the one or more nodes or destination subnets in network 100 based upon the orbital locations of each node and other orbiting objects, and the line of sight reachability to other nodes in the network 100. Each node can then generate a time-based rolling forwarding table based on the location and the length of time of the line of sight occlusion. For example, in some embodiments, entries within the time-based rolling forwarding table can include next hops and tunnel encapsulations for the packet that minimize the length of time of the line of sight occlusion associated with the object. This means that paths from a node to its destination can change with time in order to avoid nodes that lose their line of sight connectivity to their next hop node. Entries within the forwarding table can be dynamically updated over time so that potential traffic paths reflect the changing dynamics of objects and/or nodes within network 100.

For example, node 110e may receive traffic with a destination address of node 110b. In a stationary environment, the fastest path would be from node 110e to node 110c, and then on to node 110b. However, as node 110e orbits around moon 106, node 110c is eclipsed by the moon 106, and the line of sight connectivity is served for the length of time it takes the satellite with node 110e to orbit the moon 106. A proactive re-route is determined by reassigning the route to pass from node 110e to node 110d, and then on to node 110c. For example, in some embodiments addresses within the forwarding information base (FIB) are dynamically reassigned by node 110e by automatically updating a dynamic multipoint virtual private network (DMVPN) mesh and forwarding tables in accordance with the topology changes in space-namely, that both node 110e and node 110d are orbiting around the moon 106 and, as a result, while the line of sight closes between node 110e and node 110c, the line of sight opens for node 110e and node 110d. Therefore, the forwarding tables dynamically reassign the traffic path to go from node 110e to 110d. These dynamic forwarding tables can be applied to any spoke device or endpoint device within network 100, where each spoke device or endpoint device can in some embodiments be associated with a hub by a subnet and by a Next Hop Resolution Protocol (NHRP)

identification number to route the packet in accordance with the dynamic forwarding table associated with the orbiting distributed nodes.

In some embodiments, an unbroken line of sight path is not feasible, or other factors prevent a node from directing traffic to a reachable node (e.g., a node is not suitable for receiving the traffic, the node has security issues, etc.). In such a case, a store and forward technique can be used that based on both the dynamic line of sight considerations as well as conserving node resources. In a store and forward method, the traffic is stored at the node and then forwarded to its destination at a subsequent time—e.g., node 110e can store traffic until its orbital pattern around moon 106 advances enough to restore line of sight connectivity to node 110c.

However, storage and/or hard drive space within nodes in space is resource intensive, expensive, and/or scarce. Even with delay tolerant networking, using forwarding table manipulation, the dynamic FIB with each node can proactively reduce the need for the store and forward technique. An alternate path to forward traffic can be determined, even if there are small delays in getting the traffic to its final destination. For example, traffic can be store at node 110e until line of sight is restored to node 110c instead of sending the traffic to node 110d if it is determined that the delay in storing the traffic on node 110e is less than the time it would take to send the traffic to node 110d and then on to node 110c. Therefore, using a balance between store and forward and scheduled FIB entries can reduce the time in which the store and forward technique is used, which can provide a cheaper solution as not as much is spent on resources on hard drives and storage in space—in addition to reducing the delay in routing traffic to its destination.

Therefore, in some embodiments, a node, such as node 110i, can determine that a destination for the packet (e.g., node 110d) is temporarily unreachable for packet paths based on line of sight occlusions. For example, both node 110d and node 110c are occluded by moon 106, preventing an unbroken path in the time it takes the packet to traverse it. As the packet travels between node 110i and node 110d, the packet is punted to a store-and-forward node (e.g., node 110e) as long as the line of sight occlusion prevents a forwarding path to the destination node (node 110d). The packet is then forwarded to the destination from the store-and-forward node (e.g., node 110e) based on a determination that the line of sight occlusion will end at the time of packet forwarding (e.g., line of sight will be established once the movement of node 110c brings it to a certain location at the time of packet arrival to node 110c).

Alternatively and/or additionally, a node can store packets "in transit". For example, node 110e can determine to include a packet path that includes a node that is unreachable at the time of forwarding. For example, at time t1, node 110c may be occluded by moon 106 at the time of transmission of traffic from node 110e. The packet to node 110c can be forwarded based on a determination that node 110c will become reachable within a line of sight at a subsequent time, e.g., its arrival time t2, such that the packet is stored in transit as it traverses space to a next hop. In other words, say SDN system 102 has calculated that the occlusion of node 110c will go away in 30 seconds, and that the line of sight transit from node 110e to node 110c is 31 light seconds long. The packet can be transmitted because it will arrive just after the occlusion has cleared, thereby being "stored" in transit.

In some embodiments, traffic is prevented from being forwarded to reachable downstream nodes whose storage is filling up. For example, the scheduled FIB may remove any paths through node 110d because there is not enough storage to handle the transmission of traffic.

Figure 2:
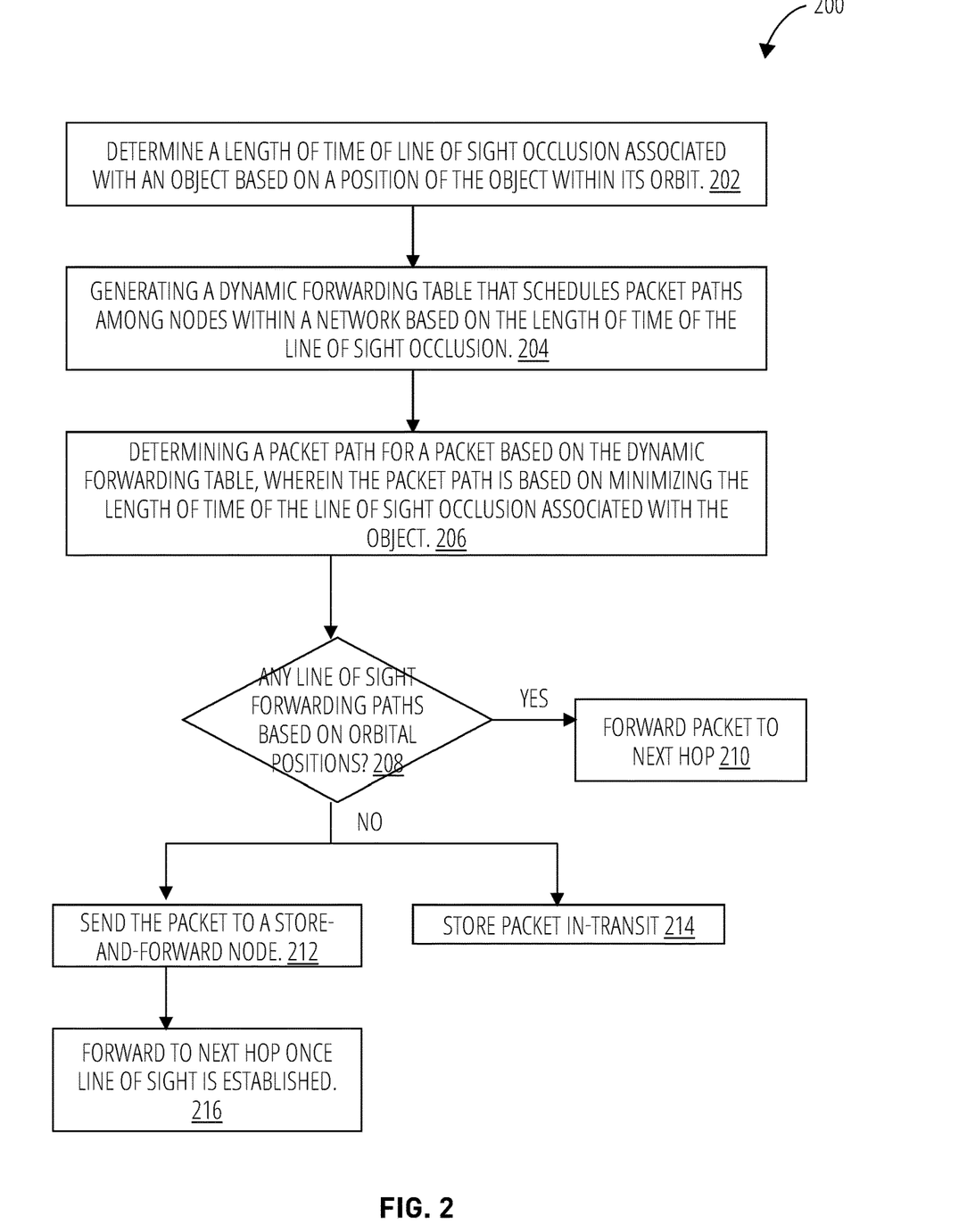
FIG. 2 illustrates a flowchart for a dynamic scheduled forwarding table within a Lunar and Interplanetary communication system in accordance with an example embodiment.

FIG. 2 illustrates an example method 200 for a dynamic scheduled forwarding table (e.g., dynamic scheduled FIB) within a Lunar and Interplanetary communication system in accordance with an example embodiment. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method 200 includes determining a length of time of a line of sight occlusion associated with an object at block 202. The length of occlusion can be based on a determination of the position of the object within its orbit over time, and the amount of distance across the celestial sphere that the object occludes within that amount of time. For example, the SDN system 102 illustrated in FIG. 1 may determine a length of time of line of sight occlusion associated with the moon 106 based on a position of the moon 106 and its surrounding nodes (node 110e, node 110d, and/or node 110c) within their orbits. The nodes may be part of a network that forms a hub and spoke structure, where the network includes ground stations as hubs and one or more of sensors, orbiting stations, and forwarding nodes as spokes. In some embodiments, a spoke device or endpoint within the network can be associated with a hub by a subnet and by a Next Hop Resolution Protocol (NHRP) identification number to route packets in accordance with the dynamic forwarding table associated with orbiting distributed nodes.

According to some examples, the method 200 includes generating a dynamic forwarding table that schedules packet paths among nodes within a network based on the length of time of the line of sight occlusion at block 204. For example, the SDN system 102 may communicate with each node illustrated in FIG. 1 to generate a dynamic forwarding table that schedules packet paths among nodes within the network. The scheduling within the dynamic forwarding table can be based on the length of time of the line of sight occlusion. Therefore, each node within the network can include a time-based rolling forwarding table with path entries based on a location and the length of time of the line of sight occlusion.

Entries within the time-based rolling forwarding table can include next hops and tunnel encapsulations for the packet that minimize the length of time of the line of sight occlusion associated with the object. This can include paths with next hops and tunnel encapsulations that remove nodes with line of sight occlusions or reduces the amount of time a given node experiences a line of sight occlusion during packet transit. The time-based rolling forwarding table can include one or more nodes or destination subnets in an extraterrestrial network based upon an orbital location and line of sight reachability to other nodes in the extraterrestrial network. For example, each node illustrated in FIG. 1 (e.g., nodes 110a-110i) may include a reachability calendar for the other nodes or destination subnets in the network 100 based upon an orbital location and line of sight reachability to other nodes in the network 100.

According to some examples, the method 200 includes determining a packet path for a packet based on the dynamic forwarding table at block 206. For example, the packet path can be determined based on minimizing the length of time of the line of sight occlusion associated with the occluding object.

The method 200 includes a determination through the time-based, scheduled forwarding table of whether a forwarding path has line of sight reachability, which can be based on orbital positions of objects within the space environment of the network at block 208. If a forwarding path within the scheduled forwarding table has unbroken line of sight reachability, even if the packet is re-routed to nodes outside of a direct path, then the packet is forwarded to its next hop at block 210.

If no forwarding path exists within unbroken line of sight reachability, then method 200 includes sending the packet to a store and forward node at block 212 for temporary storage until line of sight reachability is re-established. For example, node 110e can determine that a destination (e.g., node 110c) for the packet is temporarily unreachable for packet paths based on the line of sight occlusion from the moon 106. The packet is punted to node 110d as a store and forward node as long as the line of sight occlusion from the moon 106 prevents a forwarding path to the destination node 110c. According to some examples, the method 200 includes forwarding the packet to the destination (or next hop) from the store-and-forward node based on a determination that the line of sight occlusion will end at the time of packet forwarding at block 216.

Additionally and/or alternatively, according to some examples, the method 200 includes "in-transit" storage of the packet at block 214. For example, the scheduled forwarding table can determine that the packet path includes a node that is unreachable at the time of forwarding. However, if the node becomes reachable during the time it takes the packet to travel to its next hop, then the packet can be effectively stored in-transit as it traverses space to its next hop node. In other words, a node may forward the packet to a next hop node based on a determination that the next hop node will become reachable within a line of sight at a subsequent time.

According to some examples, the method 200 includes preventing forwarding of traffic to reachable downstream nodes within the network whose storage is filling up.

Figure 3:
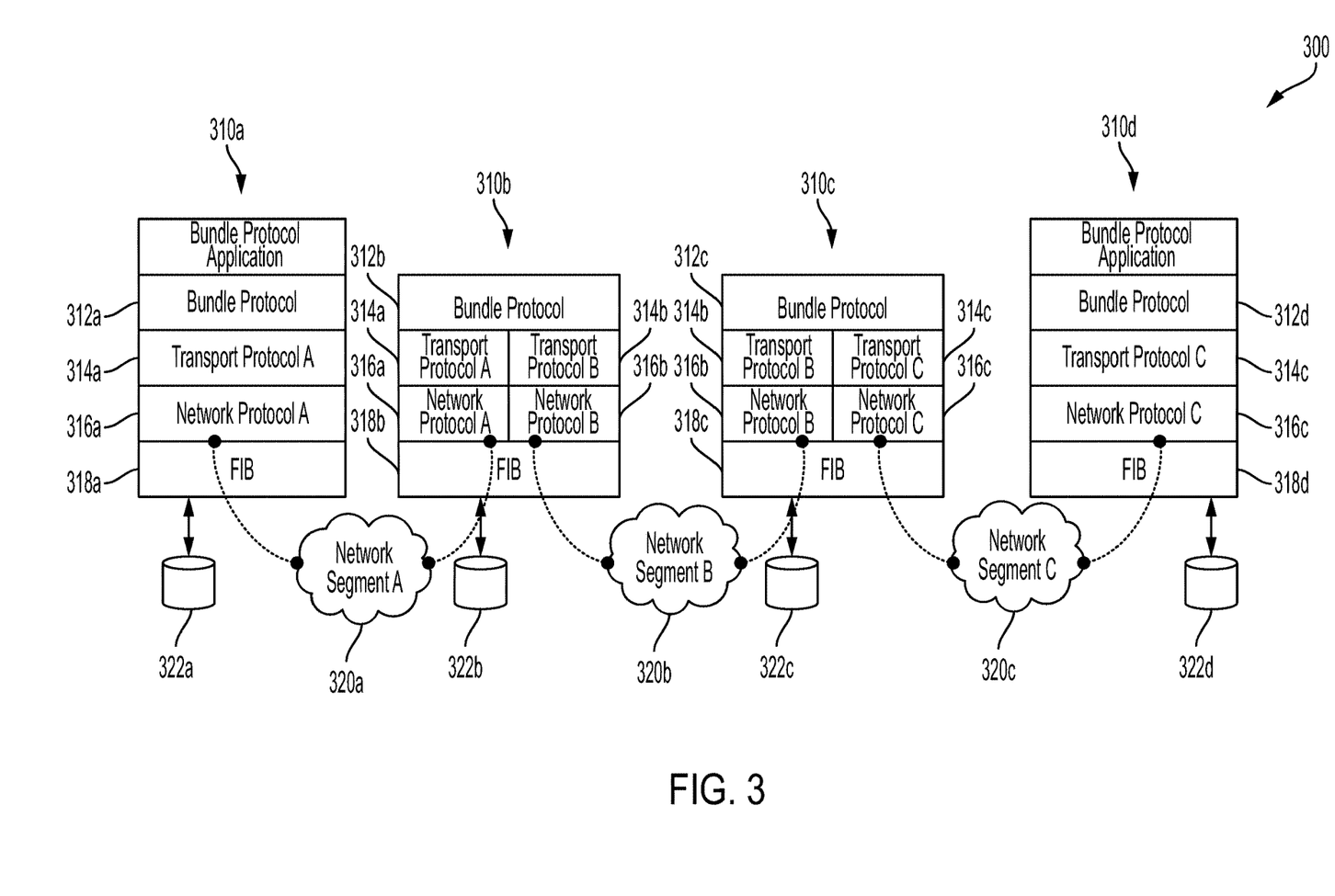
FIG. 3 illustrates an example bundle protocol including a dynamic scheduled forwarding table in accordance with an example embodiment.

FIG. 3 illustrates an example bundle protocol including a dynamic scheduled forwarding table in accordance with an example embodiment. System 300 includes node 310a, node 310b, node 310c, and node 310d, although any number of nodes can be included within system 300. A bundle protocol application, for example, may create an overlay network of store-and-forward nodes that include a rolling time-based forwarding information base (FIB) (also known as a forwarding or MAC table).

In some embodiments, bundle protocol (BP) headers 312a, 312b, 312c, and 312d sit between TCP/IP and the application payload itself, thus when traffic is switched between BP nodes, the destination IP address is changed similar to the way routers change the destination MAC address upon forwarding packets. BP is very lightweight from the perspective of header overhead and addressing scheme, so offers benefits when bandwidth is highly constrained. However, BP traffic must be hair-pinned to and from a Bundle-Node at each hop in the network, which adds delay and processing overhead.

Each node includes a transport protocol and network protocol that directs traffic to and from the node. For example, node 310a includes transport protocol A 314a and network protocol A 316a that allows traffic to traverse network segment A 320a. Node 310b can receive traffic from node 310a via network segment A 320a through transport protocol A 314a and network protocol A 316a, but then uses transport protocol B 314b and network protocol B 316b to forward traffic through network segment B 320b to node 310c. Node 310c can similarly receive traffic from node 310b via network segment B 320b through transport protocol B 314b and network protocol B 316b, but then uses transport protocol C 314c and network protocol C 316c to forward traffic through network segment C 320c to node 310d. Node 310d can receive traffic from node 310c via network segment C 320c through transport protocol C 314c and network protocol C 316c.

Each node can include a rolling, time-based FIB, such as FIB 318a on node 310a, FIB 318b on node 310b, FIB 318c on node 310c, and FIB 318d on node 310d. Since store-and-forward (e.g., DTN systems) could introduce significant delay in transmission, an alternative is provided by a dynamic (scheduled) FIB re-assignment wherein the dynamic multipoint virtual private network (DMVPN) mesh and/or forwarding tables are automatically updated to accommodate deep space topology changes that would otherwise require fallback to less performant store and forward methods. In DMVPN the spoke device or endpoint can be associated with the hub by subnet and by a Next Hop Resolution Protocol (NHRP) ID and from the routing perspective. A centralized Software defined network (SDN) system—see SDN system 102 in FIG. 1—pre-calculates a reachability calendar for every node and destination subnet in the space network based upon orbital location and line of sight reachability to other nodes in the network. The SDN system then programs every IP node in the space network with a time-based rolling forwarding table (e.g., FIB), with FIB entries that include next hops and tunnel encapsulations. Once up and running with its rolling FIB, the IP node automatically modifies its FIB per its reachability calendar.

Therefore, at time X the node will have FIB entries for known reachable prefixes and will have fallback-to-BP entries for currently unreachable (but valid soon-to-be-reachable) prefixes. The IP node will forward traffic which matches active FIB entries, and it will consider itself to be the destination for 'not-currently-reachable' prefixes and will punt the traffic to local BP store-and-forward element further up the stack. In this way, the system will not impose any limitations of the size of the network or the number of orbiting stations (spokes) or any other part of the constellation. In addition, in some embodiments the architecture can deliver end to end security, PKI based encryption and authentication over full or partial mesh design.

In some embodiments, each node can have storage 322a, 322b, 322c, and 322d for temporary storage when no line of sight path exists or the node needs to store traffic for temporary reasons.

Figure 4:
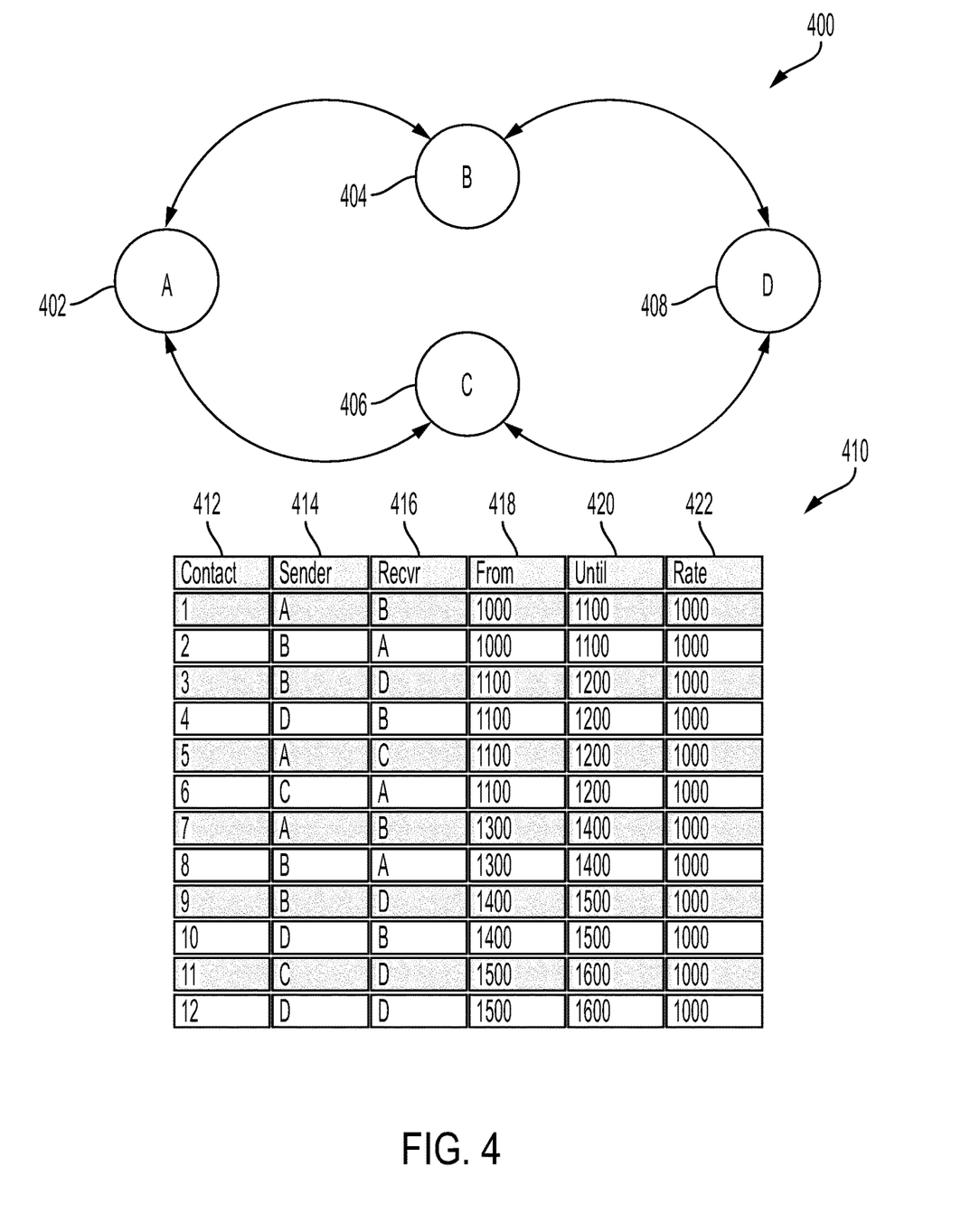
FIG. 4 illustrates a satellite constellation network topology in accordance with an example embodiment.

FIG. 4 illustrates a satellite constellation network topology in accordance with an example embodiment, with a corresponding rolling, time-based FIB 410. System 400 includes node A 402, node B 404, node C 406, and node D 408, although any number of nodes can be included within system 400. In the FIB 410, entries include a contact entry 412 (intervals of opportunity for data transmission from one node to another), with information identifying the sender 414 node, the receiver 416 node, the start of transmission time 418, the receiving time 420, and the rate of transmission 422. For example, FIB 410 shows that packets traversing from node A 402 to node B 404 has line of sight reachability from time 1000 to 1100, and so on.

For example, in some embodiments the root vertex may be thought of as corresponding to bundle creation, the conveyance of bundle content 'from' the application 'to' the BPA, both at the source node. The terminal vertex may be thought of as corresponding to bundle delivery, the conveyance of bundle content 'from' the BPA 'to' the application, both at the destination node. The edges are episodes of data retention at a node. That is, the vertex for contact 1 (transmission of data from node A 402 to node B 404) is connected to the vertex for contact 2 (transmission of data from node B 404 to node C 406) by an edge indicating a period of data retention at node B 404, while node B 404 waits for contact 2 to start.

Figure 5:
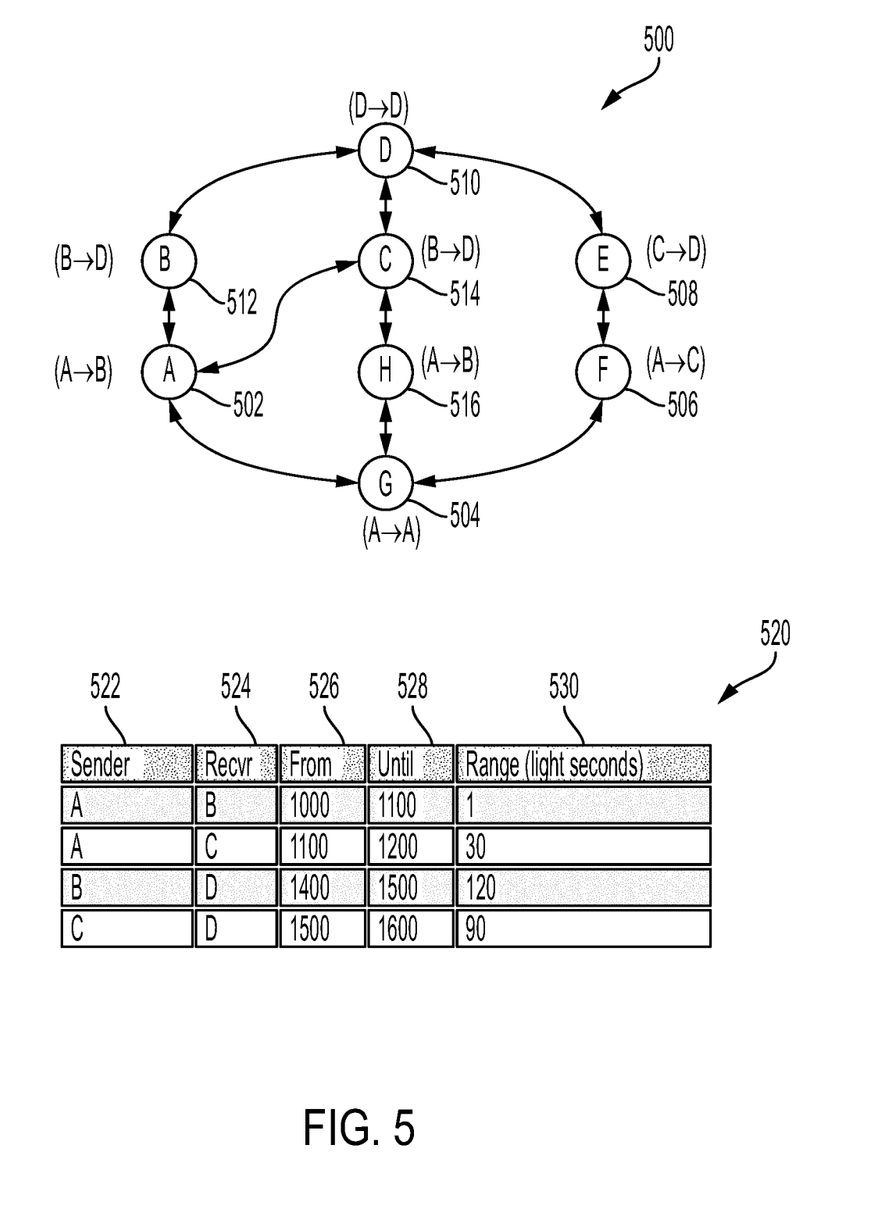
FIG. 5 illustrates packet paths in a satellite constellation network in accordance with an example embodiment.

FIG. 5 illustrates packet paths in a satellite constellation network in accordance with an example embodiment with a corresponding rolling, alternative time-based FIB 520. System 500 includes node A 502, node B 512, node C 514, node D 510, node E 508, node F 506, node G 504, and node H 516, although any number of nodes can be included within system 500. In the FIB 520, entries include information identifying the sender 522 node, the receiver 524 node, the start of transmission time 526, the receiving time 528, and the range 530 in light seconds for transmission.

For example, FIB 520 shows that for packets traversing from node A 502 to node B 512, line of sight reachability lasts from time 1000 to 1100. Moreover, the time it takes for a packet to travel from node A 502 to node B 512 would take 1 light second.

In embodiments and/or circumstances in which in transit storage is used, the range 530 is useful in determining how long traffic can be effectively stored in space. For example, packets can be stored in-transit for 120 seconds as a packet travels from node B 512 to node D 510.

Therefore, the disclosed systems and methods overcome the limitations of the size of a constellation of nodes providing IP services in space due to the limited ability of Delay-tolerant networking (DTN) to forward peer to peer encrypted traffic in hub to spoke and/or spoke to spoke architectures. Here a centralized SDN system pre-calculates a reachability calendar for every node in the space network based upon orbital location and line of sight reachability to other nodes in the network. The SDN system then programs every IP node in the space network with a time-based rolling forwarding table. Once up and running with its rolling FIB, the IP node automatically modifies its FIB per its reachability calendar.

A rolling FIB within the nodes of the network provides many benefits, some of which are: the operation of a space-based IP network without routing protocols and other control plane functions with timers that will expire due to long round trip times (RTTs); the optimization of scarce forwarding resources and minimization of the use of performance impacting store-and-forward hops; alleviating the requirement that all senders and receivers either support Bundle Protocol or carry an onboard BP agent/sidecar to intercept and encapsulate/decapsulate traffic; and given the fact that many links in the space network are of such great distance that transmit times could be many seconds or minutes, these methods and systems allow for IP traffic to be forwarded to a node that is unreachable at the time of forwarding, but then becomes reachable in time for the traffic to arrive. Thus, the traffic is effectively 'stored in transit'.

Figure 6:
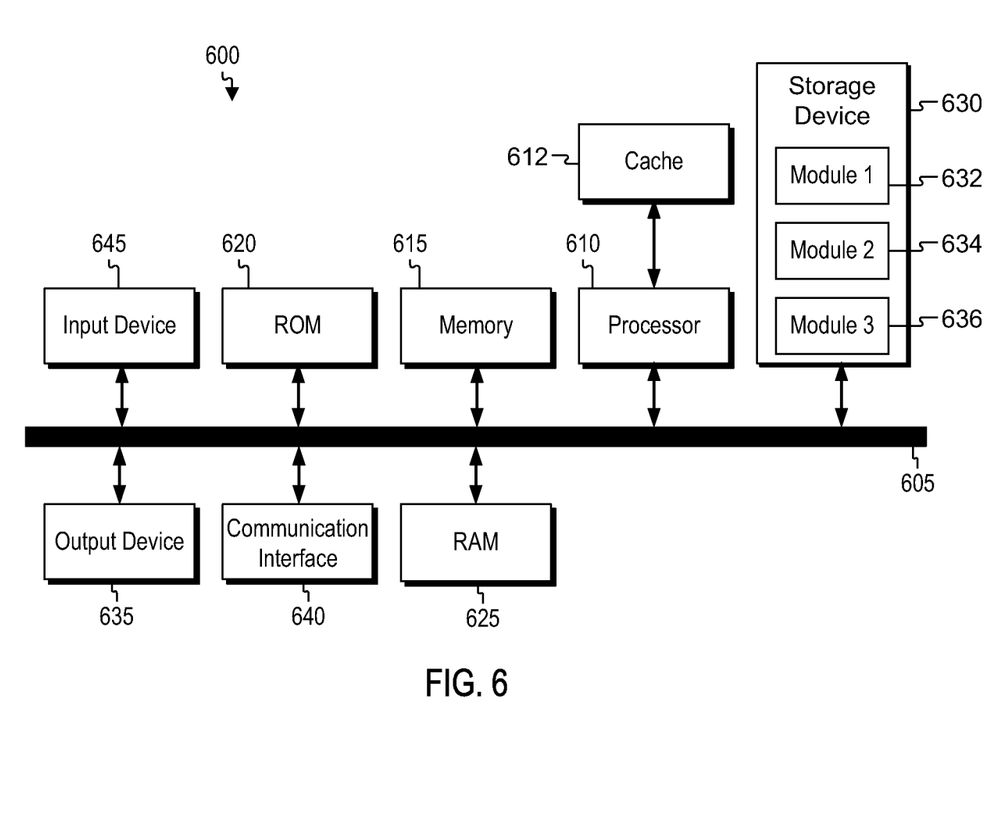
FIG. 6 shows an example network device, according to some aspects of the present disclosure.

FIG. 6 shows an example of computing system 600, which can be for example any computing device making up network 100, system 300, system 400, and/or system 500 or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A method comprising: determining a length of time of line of sight occlusion associated with an object based on a position of the object within its orbit; generating a dynamic forwarding table that schedules packet paths among nodes within a network based on the length of time of the line of sight occlusion; determining a packet path for a packet based on the dynamic forwarding table, wherein the packet path is based on minimizing the length of time of the line of sight occlusion associated with the object.

Aspect 2. The method of Aspect 1, the method further comprising: determining that a destination for the packet is temporarily unreachable for packet paths based on the line of sight occlusion; as the packet travels between nodes, punting the packet to a store-and-forward node as long as the line of sight occlusion prevents a forwarding path to the destination; and forwarding the packet to the destination from the store-and-forward node based on a determination that the line of sight occlusion will end at the time of packet forwarding.

Aspect 3. The method of any of Aspects 1 to 2, wherein the network comprises ground stations as hubs and one or more of sensors, orbiting stations, and forwarding nodes as spokes.

Aspect 4. The method of any of Aspects 1 to 3, the method further comprising: dynamically reassigning addresses within a forwarding information base (FIB) by automatically updating a dynamic multipoint virtual private network (DMVPN) mesh and forwarding tables in accordance with topology changes in space.

Aspect 5. The method of any of Aspects 1 to 4, wherein a spoke device or endpoint within the network is associated with a hub by a subnet and by a Next Hop Resolution Protocol (NHRP) identification number to route the packet in accordance with the dynamic forwarding table associated with orbiting distributed nodes.

Aspect 6. The method of any of Aspects 1 to 5, the method further comprising: proactively determining, in a centralized Software Defined Network (SDN) system, a reachability calendar for one or more nodes or destination subnets in an extraterrestrial network based upon an orbital location and line of sight reachability to other nodes in the extraterrestrial network.

Aspect 7. The method of any of Aspects 1 to 6, the method further comprising: generating, at each node within the network, a time-based rolling forwarding table based on a location and the length of time of the line of sight occlusion; and wherein entries within the time-based rolling forwarding table include next hops and tunnel encapsulations for the packet that minimize the length of time of the line of sight occlusion associated with the object.

Aspect 8. The method of any of Aspects 1 to 7, the method further comprising: determining that the packet path includes a node that is unreachable at the time of forwarding; forwarding the packet to the node based on a determination that the node will become reachable within a line of sight at a subsequent time, such that the packet is stored in transit as it traverses space to a next hop.

Aspect 9. The method of any of Aspects 1 to 8, the method further comprising: preventing forwarding of traffic to reachable downstream nodes within an extraterrestrial network whose storage is filling up.

Aspect 10. The method of any of Aspects 1 to 9, wherein the packet path is selected to include a node that takes longer to traverse than other nodes based on line of sight availability, but preserves message integrity.

Aspect 11. The computing apparatus of any of Aspects 1 to 10, wherein the instructions further configure the apparatus to: determine that a destination for the packet is temporarily unreachable for packet paths based on the line of sight occlusion; as the packet travels between nodes, punt the packet to a store-and-forward node as long as the line of sight occlusion prevents a forwarding path to the destination; and forward the packet to the destination from the store-and-forward node based on a determination that the line of sight occlusion will end at the time of packet forwarding.

Aspect 12. The computing apparatus of any of Aspects 1 to 11, wherein the network comprises ground stations as hubs and one or more of sensors, orbit stations, and forwarding nodes as spokes.

Aspect 13. The computing apparatus of any of Aspects 1 to 12, wherein the instructions further configure the apparatus to: dynamically reassign addresses within a forwarding information base (FIB) by automatically updating a dynamic multipoint virtual private network (DMVPN) mesh and forwarding tables in accordance with topology changes in space.

Aspect 14. The computing apparatus of any of Aspects 1 to 13, wherein a spoke device or endpoint within the network is associated with a hub by a subnet and by a Next Hop Resolution Protocol (NHRP) identification number to route the packet in accordance with the dynamic forward table associated with orbiting distributed nodes.

Aspect 15. The computer-readable storage medium of any of Aspects 1 to 14, the method wherein the instructions further configure the computer to: determine that a destination for the packet is temporarily unreachable for packet paths based on the line of sight occlusion; as the packet travels between nodes, punt the packet to a store-and-forward node as long as the line of sight occlusion prevents a forwarding path to the destination; and forward the packet to the destination from the store-and-forward node based on a determination that the line of sight occlusion will end at the time of packet forwarding.

Aspect 16. The computer-readable storage medium of any of Aspects 1 to 15, wherein the network comprises ground stations as hubs and one or more of sensors, orbit stations, and forwarding nodes as spokes.

Aspect 17. The computer-readable storage medium of any of Aspects 1 to 16, the method wherein the instructions further configure the computer to: dynamically reassign addresses within a forwarding information base (FIB) by automatically updating a dynamic multipoint virtual private network (DMVPN) mesh and forwarding tables in accordance with topology changes in space.

Aspect 18. The computer-readable storage medium of any of Aspects 1 to 17, wherein a spoke device or endpoint within the network is associated with a hub by a subnet and by a Next Hop Resolution Protocol (NHRP) identification number to route the packet in accordance with the dynamic forward table associated with orbiting distributed nodes.

Aspect 19. The computer-readable storage medium of any of Aspects 1 to 18, the method wherein the instructions further configure the computer to: generate, at each node within the network, a time-based rolling forwarding table based on a location and the length of time of the line of sight occlusion; and wherein entries within the time-based rolling forwarding table include next hops and tunnel encapsulations for the packet that minimize the length of time of the line of sight occlusion associated with the object.

Aspect 20. A non-transitory computer-readable storage medium, the computer-readable storage medium including instructions that when executed by a computer, cause the computer to: determine a length of time of line of sight occlusion associated with an object based on a position of the object within its orbit; generate a dynamic forwarding table that schedules packet paths among nodes within a network based on the length of time of the line of sight occlusion; determine a packet path for a packet based on the dynamic forwarding table, wherein the packet path is based on minimizing the length of time of the line of sight occlusion associated with the object.

What is claimed is:

1. A method comprising:
   determining a length of time of line of sight occlusion associated with an object based on a position of the object within its orbit;
   generating a dynamic forwarding table that schedules packet paths among nodes within a network based on the length of time of the line of sight occlusion;
   determining a packet path for a packet based on the dynamic forwarding table, wherein the packet path is based on minimizing the length of time of the line of sight occlusion associated with the object.

2. The method of claim 1, the method further comprising:
   determining that a destination for the packet is temporarily unreachable for packet paths based on the line of sight occlusion;
   as the packet travels between nodes, punting the packet to a store-and-forward node as long as the line of sight occlusion prevents a forwarding path to the destination; and
   forwarding the packet to the destination from the store-and-forward node based on a determination that the line of sight occlusion will end at the time of packet forwarding.

3. The method of claim 1, wherein the network comprises ground stations as hubs and one or more of sensors, orbiting stations, and forwarding nodes as spokes.

4. The method of claim 1, the method further comprising:
   dynamically reassigning addresses within a forwarding information base (FIB) by automatically updating a dynamic multipoint virtual private network (DMVPN) mesh and forwarding tables in accordance with topology changes in space.

5. The method of claim 1, wherein a spoke device or endpoint within the network is associated with a hub by a subnet and by a Next Hop Resolution Protocol (NHRP) identification number to route the packet in accordance with the dynamic forwarding table associated with orbiting distributed nodes.

6. The method of claim 1, the method further comprising:
   proactively determining, in a centralized Software Defined Network (SDN) system, a reachability calendar for one or more nodes or destination subnets in an extraterrestrial network based upon an orbital location and line of sight reachability to other nodes in the extraterrestrial network.

7. The method of claim 1, the method further comprising:
   generating, at each node within the network, a time-based rolling forwarding table based on a location and the length of time of the line of sight occlusion; and
   wherein entries within the time-based rolling forwarding table include next hops and tunnel encapsulations for the packet that minimize the length of time of the line of sight occlusion associated with the object.

8. The method of claim 1, the method further comprising:
determining that the packet path includes a node that is unreachable at the time of forwarding;
forwarding the packet to the node based on a determination that the node will become reachable within a line of sight at a subsequent time, such that the packet is stored in transit as it traverses space to a next hop.

9. The method of claim 1, the method further comprising:
preventing forwarding of traffic to reachable downstream nodes within an extraterrestrial network whose storage is filling up.

10. A computing apparatus comprising:
a processor; and
a memory storing instructions that, when executed by the processor, configure the apparatus to:
determine a length of time of line of sight occlusion associated with an object based on a position of the object within its orbit;
generate a dynamic forwarding table that schedules packet paths among nodes within a network based on the length of time of the line of sight occlusion;
determine a packet path for a packet based on the dynamic forwarding table, wherein the packet path is based on minimizing the length of time of the line of sight occlusion associated with the object.

11. The computing apparatus of claim 10, wherein the instructions further configure the apparatus to:
determine that a destination for the packet is temporarily unreachable for packet paths based on the line of sight occlusion;
as the packet travels between nodes, punt the packet to a store-and-forward node as long as the line of sight occlusion prevents a forwarding path to the destination; and
forward the packet to the destination from the store-and-forward node based on a determination that the line of sight occlusion will end at the time of packet forwarding.

12. The computing apparatus of claim 10, wherein the network comprises ground stations as hubs and one or more of sensors, orbit stations, and forwarding nodes as spokes.

13. The computing apparatus of claim 10, wherein the instructions further configure the apparatus to:
dynamically reassign addresses within a forwarding information base (FIB) by automatically updating a dynamic multipoint virtual private network (DMVPN) mesh and forwarding tables in accordance with topology changes in space.

14. The computing apparatus of claim 10, wherein a spoke device or endpoint within the network is associated with a hub by a subnet and by a Next Hop Resolution Protocol (NHRP) identification number to route the packet in accordance with the dynamic forward table associated with orbiting distributed nodes.

15. A non-transitory computer-readable storage medium, the computer-readable storage medium including instructions that when executed by a computer, cause the computer to:
determine a length of time of line of sight occlusion associated with an object based on a position of the object within its orbit;
generate a dynamic forwarding table that schedules packet paths among nodes within a network based on the length of time of the line of sight occlusion;
determine a packet path for a packet based on the dynamic forwarding table, wherein the packet path is based on minimizing the length of time of the line of sight occlusion associated with the object.

16. The computer-readable storage medium of claim 15, the method wherein the instructions further configure the computer to:
determine that a destination for the packet is temporarily unreachable for packet paths based on the line of sight occlusion;
as the packet travels between nodes, punt the packet to a store-and-forward node as long as the line of sight occlusion prevents a forwarding path to the destination; and
forward the packet to the destination from the store-and-forward node based on a determination that the line of sight occlusion will end at the time of packet forwarding.

17. The computer-readable storage medium of claim 15, wherein the network comprises ground stations as hubs and one or more of sensors, orbit stations, and forwarding nodes as spokes.

18. The computer-readable storage medium of claim 15, the method wherein the instructions further configure the computer to:
dynamically reassign addresses within a forwarding information base (FIB) by automatically updating a dynamic multipoint virtual private network (DMVPN) mesh and forwarding tables in accordance with topology changes in space.

19. The computer-readable storage medium of claim 15, wherein a spoke device or endpoint within the network is associated with a hub by a subnet and by a Next Hop Resolution Protocol (NHRP) identification number to route the packet in accordance with the dynamic forward table associated with orbiting distributed nodes.

20. The computer-readable storage medium of claim 15, the method wherein the instructions further configure the computer to:
generate, at each node within the network, a time-based rolling forwarding table based on a location and the length of time of the line of sight occlusion; and
wherein entries within the time-based rolling forwarding table include next hops and tunnel encapsulations for the packet that minimize the length of time of the line of sight occlusion associated with the object.

* * * * *